US012737544B1

(12) United States Patent
Ardazi et al.

(10) Patent No.: US 12,737,544 B1
(45) Date of Patent: Sep. 15, 2026

(54) UNSUPERVISED DETECTION OF HALLUCINATIONS IN LANGUAGE MODEL OUTPUTS

(71) Applicant: Intuit Inc., Mountain View, CA (US)

(72) Inventors: Shai Ardazi, Petach-Tikva (IL); Matan Vetzler, Givat-Shmuel (IL); Amir Bialer, Tel-Aviv (IL); Noa Haas, Tel Aviv (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/264,632

(22) Filed: Jul. 9, 2025

(51) Int. Cl.
*G06F 40/279* (2020.01)
*G06F 40/30* (2020.01)
*G06N 3/088* (2023.01)

(52) U.S. Cl.
CPC .................................. *G06F 40/279* (2020.01)

(58) Field of Classification Search
CPC .... G06F 40/279; G06F 40/284; G06F 40/289; G06F 40/30; G06F 40/35; G06N 3/0475; G06N 3/088
USPC ........................................... 704/1, 9; 706/12
See application file for complete search history.

(56) References Cited

U.S. PATENT DOCUMENTS 12,373,649 B1 * 7/2025 Mathews ................ G06F 40/30
12,443,638 B1 * 10/2025 Sinha .................. G06F 16/3347
2017/0337181 A1 * 11/2017 Belov ..................... G06F 40/30
2022/0414320 A1 * 12/2022 Dolan ..................... G06F 40/30
2023/0062177 A1 * 3/2023 Landry ................... G06F 40/30
2023/0068145 A1 * 3/2023 Landry ............... G06F 16/3346
2024/0184988 A1 * 6/2024 Sridhar ................... G06F 40/30
2024/0386207 A1 * 11/2024 Emrey .................. G06F 40/295
2024/0394512 A1 * 11/2024 Cunningham .......... G06F 40/30
2024/0394600 A1 * 11/2024 Cunningham .......... G06F 40/30
2024/0419912 A1 * 12/2024 Somech ................ G06F 40/279
2025/0061286 A1 * 2/2025 Zhou ....................... G06F 40/30
2025/0111151 A1 * 4/2025 Huang .................. G06F 40/284
2025/0259115 A1 8/2025 Jeyashekar et al.
2025/0291828 A1 * 9/2025 Wood .................... G06F 40/284
2026/0050807 A1 * 2/2026 Watson ................ G06N 3/0455
2026/0065029 A1 * 3/2026 Lee ......................... G06F 40/30

* cited by examiner

*Primary Examiner* — Martin Lerner
(74) *Attorney, Agent, or Firm* — Dinsmore & Shohl LLP

(57) ABSTRACT

Certain aspects of the disclosure provide a method for unsupervised detection of hallucinations in generative language model outputs. The method includes receiving a language model output comprising tokens and corresponding confidence scores, identifying low-confidence tokens whose scores fall below a confidence score threshold, and determining unsupervised attributes of these tokens. An anomaly score is then calculated based on the unsupervised attributes, and if this score meets or exceeds a set threshold, the system predicts that the language model output contains at least one hallucination.

18 Claims, 11 Drawing Sheets

| LM Output 302 | Confidence Scores 306 |
|---|---|
| According | 0.94 |
| to | 0.95 |
| the | 0.93 |
| IRS | 0.95 |
| tax | 0.92 |
| code, | 0.95 |
| 401(k) | 0.93 |
| contributions | 0.92 |
| are | 0.94 |
| tax-deferred | 0.78 |
| while | 0.77 |
| the | 0.75 |
| Platinum | 0.48 |
| Tax | 0.52 |
| Relief | 0.51 |
| Program | 0.47 |
| allows | 0.54 |
| citizens | 0.87 |
| to | 0.91 |
| claim | 0.85 |
| up | 0.89 |
| to | 0.9 |
| $12,000 | 0.45 |
| in | 0.87 |
| additional | 0.84 |
| exemptions. | 0.82 |

*FIG. 3*

| LM Output 302 | Confidence Scores 306 |
|---|---|
| According | 0.94 |
| to | 0.95 |
| the | 0.93 |
| IRS | 0.95 |
| tax | 0.92 |
| code, | 0.95 |
| 401(k) | 0.93 |
| contributions | 0.92 |
| are | 0.94 |
| *tax-deferred* | *0.78* |
| *while* | *0.77* |
| *the* | *0.75* |
| **Platinum** | **0.48** |
| **Tax** | **0.52** |
| **Relief** | **0.51** |
| **Program** | **0.47** |
| allows | 0.54 |
| citizens | 0.87 |
| to | 0.91 |
| claim | 0.85 |
| up | 0.89 |
| to | 0.9 |
| **$12,500** | **0.45** |
| in | 0.87 |
| additional | 0.84 |
| exemptions. | 0.82 |

Confidence Score Threshold 404

Total Tokens
504

27 Tokens

Low-Confidence Tokens
506

9

Density
508

9 / 27 = 33%

| LM Output 302 | Confidence Scores 306 |
|---|---|
| According | 0.94 |
| to | 0.95 |
| the | 0.93 |
| IRS | 0.95 |
| tax | 0.92 |
| code, | 0.95 |
| 401(k) | 0.93 |
| contributions | 0.92 |
| are | 0.94 |
| *tax-deferred* | *0.78* |
| *while* | *0.77* |
| *the* | *0.75* |
| **Platinum** | **0.48** |
| **Tax** | **0.52** |
| **Relief** | **0.51** |
| **Program** | **0.47** |
| allows | 0.54 |
| citizens | 0.87 |
| to | 0.91 |
| claim | 0.85 |
| up | 0.89 |
| to | 0.9 |
| **$12,500** | **0.45** |
| in | 0.87 |
| additional | 0.84 |
| exemptions. | 0.82 |

*FIG. 5*

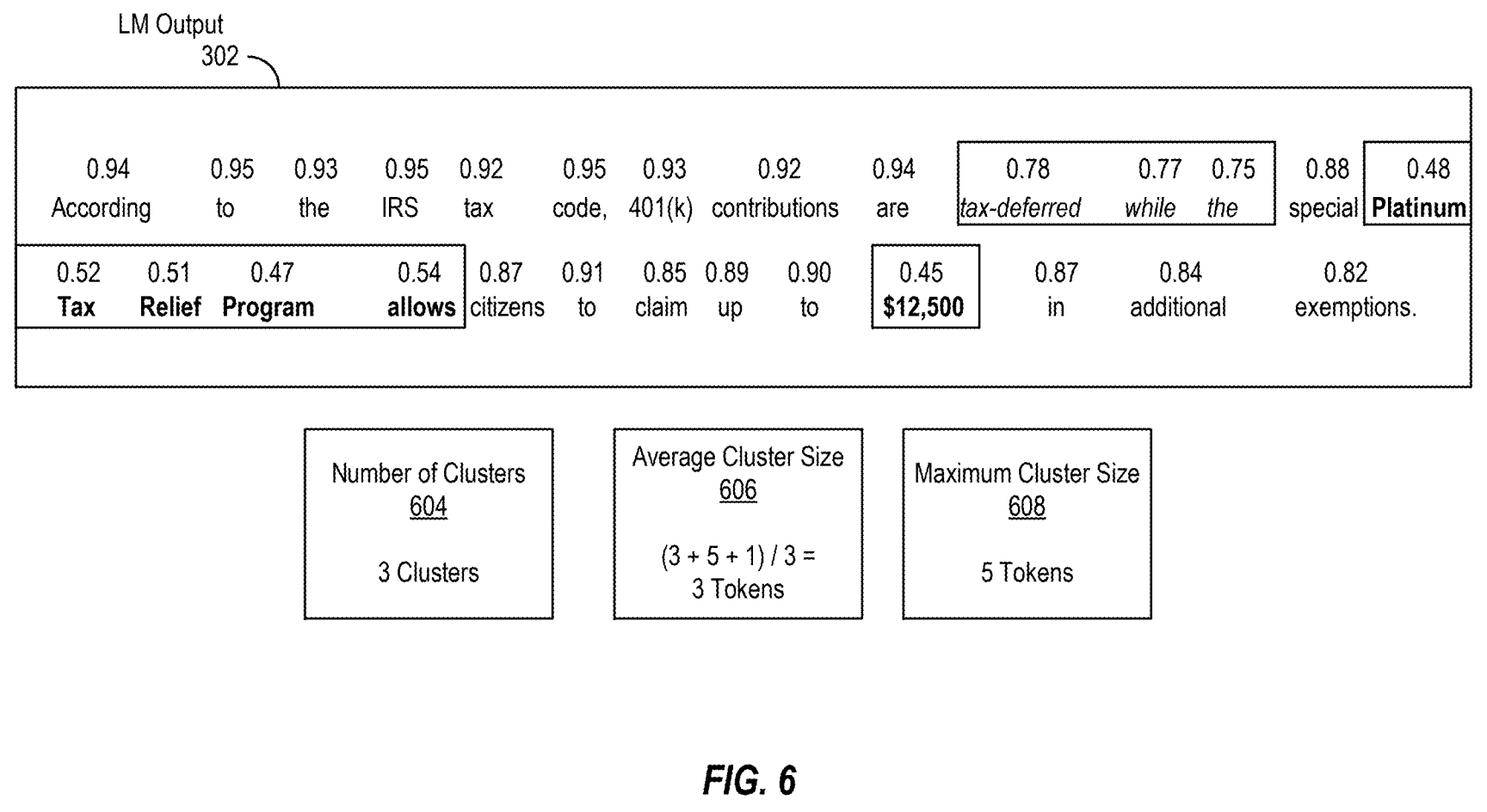

LM Output
302

0.94 According 0.95 to 0.93 the 0.95 IRS 0.92 tax 0.95 code, 0.93 401(k) 0.92 contributions 0.94 are 0.78 *tax-deferred* 0.77 *while* 0.75 *the* 0.88 special 0.48 Platinum

0.52 Tax 0.51 Relief 0.47 Program 0.54 allows 0.87 citizens 0.91 to 0.85 claim 0.89 up 0.90 to 0.45 $12,500 0.87 in 0.84 additional 0.82 exemptions.

Number of Clusters
604

3 Clusters

Average Cluster Size
606

(3 + 5 + 1) / 3 =
3 Tokens

Maximum Cluster Size
608

5 Tokens

*FIG. 6*

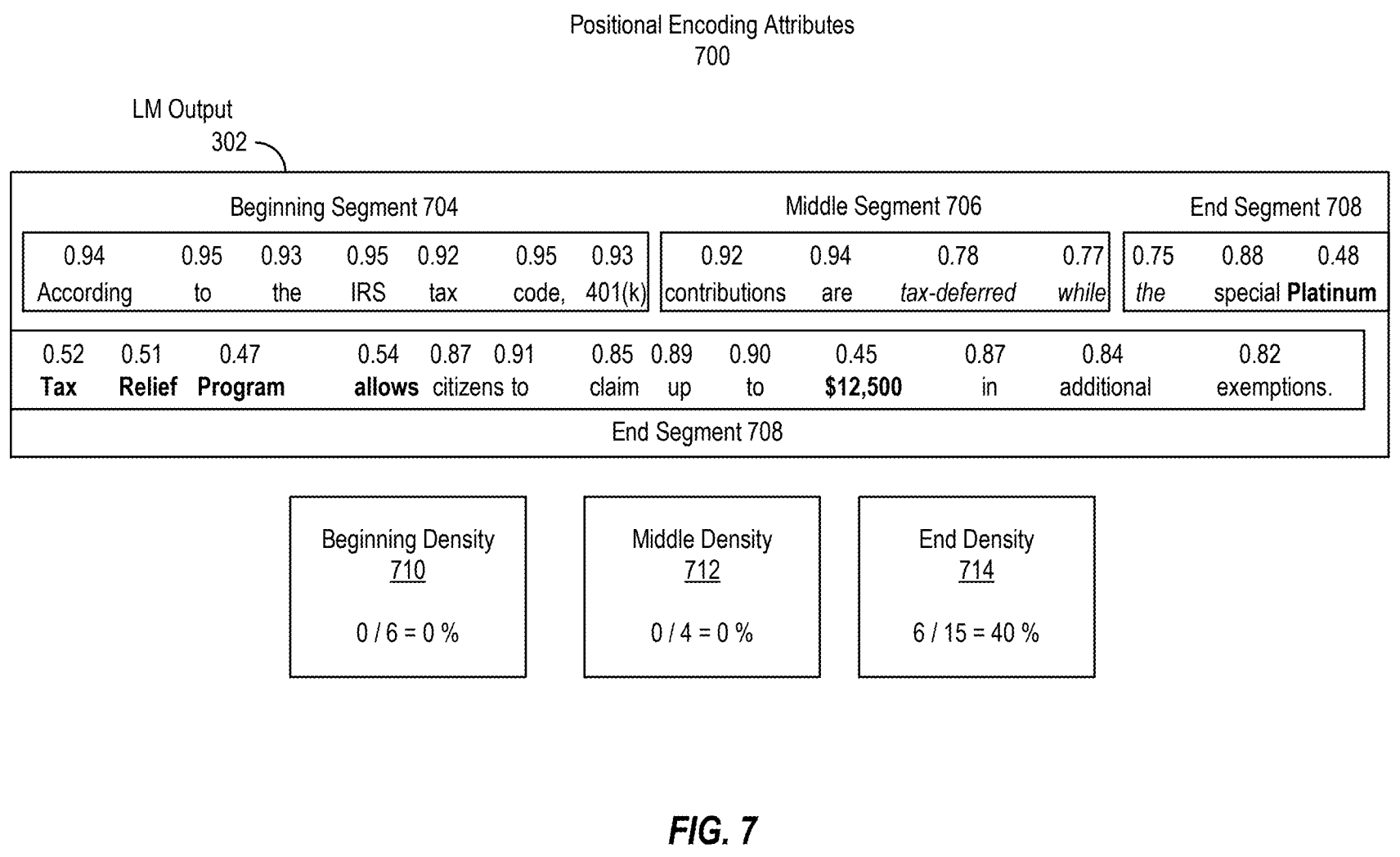

Positional Encoding Attributes
700

LM Output
302

Beginning Segment 704
Middle Segment 706
End Segment 708

0.94 According
0.95 to
0.93 the
0.95 IRS
0.92 tax
0.95 code,
0.93 401(k)
0.92 contributions
0.94 are
0.78 *tax-deferred*
0.77 *while*
0.75 *the*
0.88 special
0.48 Platinum

0.52 Tax
0.51 Relief
0.47 Program
0.54 allows
0.87 citizens
0.91 to
0.85 claim
0.89 up
0.90 to
0.45 $12,500
0.87 in
0.84 additional
0.82 exemptions.

End Segment 708

Beginning Density
710
0 / 6 = 0 %

Middle Density
712
0 / 4 = 0 %

End Density
714
6 / 15 = 40 %

FIG. 7

UNSUPERVISED DETECTION OF HALLUCINATIONS IN LANGUAGE MODEL OUTPUTS

BACKGROUND

Field

Aspects of the present disclosure relate to generative artificial intelligence.

Description of Related Art

Generative artificial intelligence (GenAI) refers to machine learning models that are able to create new content based on patterns and information learned from training data in combination with a user prompt. The user prompt provides instructions to the model on what new content to generate and how to generate that new content. Notably, the model is able to generate new content based on both the actual information (e.g., facts, knowledge) included in the training data, as well as patterns, insights, and model parameter weights learned from the training data.

GenAI models are able to generate new content in many different forms, including text, image, audio, and even video. For example, to facilitate text generation, some GenAI models are configured as language models (LMs). An LM is generally a type of machine learning model that is designed to understand, generate, and manipulate human language. More specifically, an LM is a probabilistic framework that determines the likelihood of a sequence of words or tokens. At its core, a LM attempts to predict the probability of the next word in a sentence given the preceding words. The model estimates these probabilities based on the patterns it learned during training. LMs are useful in natural language processing (NLP) and computational linguistics for performing a range of tasks involving human language.

LMs have a wide array of applications, including: text generation (e.g., producing coherent and contextually appropriate text; machine translation (e.g., converting text from one language to another); speech recognition (e.g., converting spoken language into text); text summarization (e.g., condensing a long piece of text into a shorter summary); sentiment analysis (e.g., determining the sentiment expressed in a piece of text); and question answering (e.g., automatically providing answers to questions posed in natural language).

While language models represent a transformative force in many industries by assimilating vast amounts of knowledge, such as to build conversation-driven applications, these models are not without limitation. For example, while a powerful tool, LMs may generate inaccurate or irrelevant content in response to some user queries, often referred to as hallucinations.

SUMMARY

Certain aspects provide a provide a method for performing unsupervised detection of hallucinations in generative language model output. The method includes receiving a language model output associated with a language model, the language model output comprising a plurality of tokens and a plurality of confidence scores, wherein each confidence score of the plurality of confidence scores corresponds to a respective token of the plurality of tokens and represents how confident the language model is in a prediction of the respective token of the plurality of tokens; identifying one or more low-confidence tokens having a corresponding confidence score that does not meet a confidence score threshold; determining one or more unsupervised attributes of the one or more low-confidence tokens; determining an anomaly score of the language model output based on the one or more unsupervised attributes of the one or more low-confidence tokens; determining that the anomaly score of the language model output at least meets an anomaly score threshold; and generating a prediction that the language model output comprises at least one hallucination output by the language model.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

FIG. 3 depicts an example of a language model output including a set of tokens and a set of corresponding confidence scores.

FIG. 4 depicts an example language model output reflecting the identification of low-confidence tokens in a language model output based on a confidence score threshold.

FIG. 5 depicts an example language model output reflecting the density of low-confidence tokens in the language model output.

FIG. 6 depicts an example language model output reflecting the identification of clusters and corresponding cluster attributes derived from the analysis of a language model output.

FIG. 7 depicts an example language model output reflecting the positional encoding analysis of low-confidence token densities across segmented portions of a language model output.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
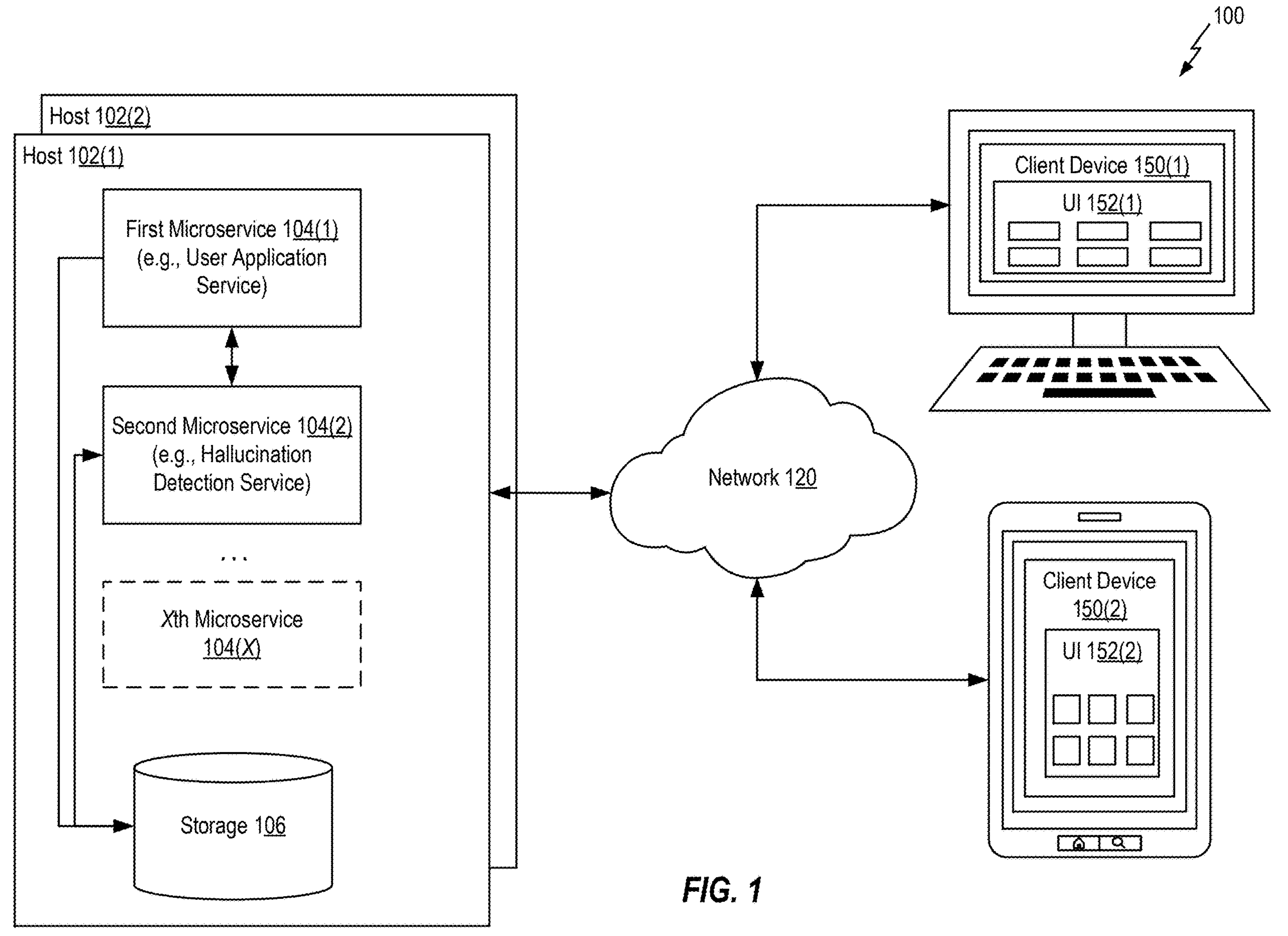
FIG. 1 depicts an example architecture for implementing a hallucination detection service in a user application.

LMs are often trained using large corpora of text. The training process involves adjusting the model's parameters to minimize the difference between its predicted word probabilities and the actual word sequences in the training data. This is typically done via techniques like maximum likelihood estimation and gradient descent. The training data set used at this stage of training is typically configured as a general-purpose training dataset, meaning the LM is trained to perform a wide range of tasks, including language understanding across many different knowledge domains. For example, LMs are trained on vast datasets that often include diverse and extensive sources of text from the internet, books, articles, and various other textual corpora (e.g., domain-specific corpora). The large volume of training data contributes to their broad generalization capabilities.

During the inference process of an LM, the generation of a new token begins with the model analyzing the preceding context, represented as a sequence of tokens, to predict the most probable next token. This is achieved by processing the input sequence through multiple layers of the model's architecture, such as transformers, to compute a probability distribution over the entire vocabulary. The probabilities are derived from the model's learned parameters, which encode patterns and relationships from the training data. The token with the greatest likelihood is typically selected, although techniques like beam search or sampling may be employed to introduce diversity or optimize the overall sequence.

However, during the token generation process, the LM may predict and/or select one or more tokens that are inaccurate, irrelevant, or fabricated with respect to the input prompt or the preceding context of the LM output. These inaccurate, irrelevant, or fabricated tokens are often referred to as hallucinations. Hallucinations can occur during this process even when the LM generates tokens that may be contextually plausible but may still be factually incorrect or fabricated. This often arises from limitations in the training data, such as incomplete or biased information, or from the model's reliance on statistical patterns rather than factual verification. Additionally, low-confidence predictions, where the model assigns relatively low probabilities to all candidate tokens, can increase the likelihood of hallucinations, as the model may resort to generating outputs that deviate from factual accuracy to maintain fluency or coherence.

Existing solutions for detecting hallucinations in LM outputs using supervised methods typically rely on labeled datasets to train classifiers or other machine learning models. These approaches involve annotating LM outputs with labels indicating whether they contain hallucinations, which are then used to train a detection model. For instance, supervised methods may employ binary classifiers or regression models that analyze features such as token probabilities, perplexity scores, or semantic coherence to predict the likelihood of hallucinations. Additionally, some systems integrate external fact-checking databases or knowledge graphs to verify the factual accuracy of generated content, further enhancing detection capabilities. While these methods can achieve accuracy, they are often constrained by the availability and quality of labeled training data, which can be expensive and time-consuming to generate. Moreover, supervised approaches may struggle to generalize across diverse datasets or domains, as they rely heavily on the specific characteristics of the training data. These limitations underscore the need for alternative unsupervised techniques that can operate effectively without requiring labeled datasets.

Accordingly, aspects described herein overcome the aforementioned technical problems and improve upon the state of the art by introducing services, systems, and methods for detecting hallucinations in LM outputs based on identifying low-confidence tokens and corresponding unsupervised attributes. A low-confidence token is a token that has a corresponding confidence score that does not meet a confidence score threshold set for the respective LM output. An unsupervised attribute is an attribute that can be determined based on information about the tokens of the LM output without training the LM to identify hallucinations or using labeled data.

In particular, aspects of the hallucination detection service described herein identify hallucinations in LM outputs by leveraging an unsupervised approach that analyzes the distribution of low-confidence tokens. Initially, the system extracts confidence scores for each token in the output and applies a confidence score threshold to identify low-confidence tokens, which are indicative of regions where the model exhibits uncertainty in token generation. The hallucination detection service then calculates various unsupervised attributes, including the density of low-confidence tokens, clustering patterns, positional encoding of low-confidence tokens within the output, and sliding window density metrics. These attributes are aggregated into a feature vector that represents the characteristics of the LM output. An anomaly detection algorithm, such as the Local Outlier Factor (LOF) algorithm, evaluates the feature vector to compute an anomaly score, which is then compared against a predefined threshold to determine whether the output likely contains hallucinations.

Thus, the disclosed hallucination detection service offers notable technical advancements over existing solutions by removing the dependency on labeled datasets or external fact-checking sources, which are often resource-intensive and tailored to specific domains. Unlike supervised methods that require extensive training on annotated data, the proposed approach utilizes unsupervised techniques to analyze characteristics of LM outputs, such as token confidence scores, clustering patterns, and positional encoding. This facilitates the detection of hallucinations in a scalable and adaptable manner across a variety of datasets and applications.

Furthermore, the use of unsupervised anomaly detection algorithms, such as LOF, allows the system to dynamically adjust to evolving LM outputs without requiring retraining. By concentrating on low-confidence tokens and their distribution, the process achieves improved accuracy in identifying hallucinations while maintaining computational efficiency. These technical features collectively enhance the reliability and trustworthiness of LM outputs, making the solution particularly useful in scenarios where labeled data is unavailable or impractical to obtain.

Example Computing Environment Implementing a Hallucination Detection Service

FIG. 1 depicts an example system 100 supporting a plurality of the microservices 104 (e.g., software-defined services, which in some cases, may be cloud-native). As shown in FIG. 1, system 100 includes client devices 150 (1)-(2) (collectively referred to herein as "client devices 150") and hosts 102(1)-(2) (collectively referred to herein as "hosts 102") interconnected through a network 120. Network 120 may be, for example, a direct link, a local area network (LAN), a wide area network (WAN), such as the Internet, another type of network, or a combination of one or more of these networks.

Hosts 102 may be geographically co-located servers on the same rack or on different racks in any arbitrary location in a data center. Hosts 102 may be constructed on a server grade hardware platform and include components of a computing device such as, one or more processors (central processing units (CPUs)), one or more memories (random access memory (RAM)), one or more network interfaces (e.g., physical network interfaces (PNICs)), storage 106, and other components (e.g., only storage 106 is shown in FIG. 1).

A first host 102(1) in system 100 may host a plurality of microservices 104(1)-(X) (collectively referred to herein as "microservices 104"), where X is an integer greater than one. The microservices 104 may be deployed using virtual machines (VMs) and/or container(s) running on first host 102(1) (e.g., where first host 102(1) is running a hypervisor (not shown) used to abstract processor, memory, storage, and networking resources of first host 102(1)'s hardware platform). Generally, microservices 104 are loosely coupled and independently deployable services (or software) that may make up an application. Microservices 104 may enable segmented, granular level functionalities within a larger system infrastructure.

Client device 150(1) and client device 150(2) may each include a user interface (UI) 152(1), 152(2), respectively, which may be used to communicate with, at least, a first microservice 104(1) and/or another of the microservices 104, through the X-th microservice 104(X) using the network 120. For example, communication between client devices 150 and at least one of the microservices 104 may be facilitated by one or more application programming interfaces (APIs). Examples of client devices 150 may include a smartphone, a personal computer, a tablet, a laptop computer, and/or other devices.

As shown in FIG. 1, in certain aspects, the first microservice 104(1) implements a user-application service, such as a question-answer plugin. A question-answer plugin is a type of user interface that is configured for submitting and answering user queries. Question-answer plugins can also be referred to as automated assistants or chatbots, which are configured to simulate conversations with human users and provide answers or perform tasks based on user queries. In certain aspects, the second microservice 104(2) implements a hallucination detection service according to the aspects described herein.

Though FIG. 1 depicts each of first host 102(1), storage 106, client device 150(1), and client device 150(2) as single devices for ease of illustration, first host 102(1), storage 106, client device 150(1), and/or client device 150(2) may be embodied in different forms for different implementations. Further, though FIG. 1 depicts only two of the hosts 102 and two of the client devices 150, other examples may include more or fewer of the hosts 102 and/or client devices 150, and client devices 150 may use any combination of microservices 104 on any of hosts 102 where microservices 104 are deployed.

Detecting Hallucinations

Figure 2:
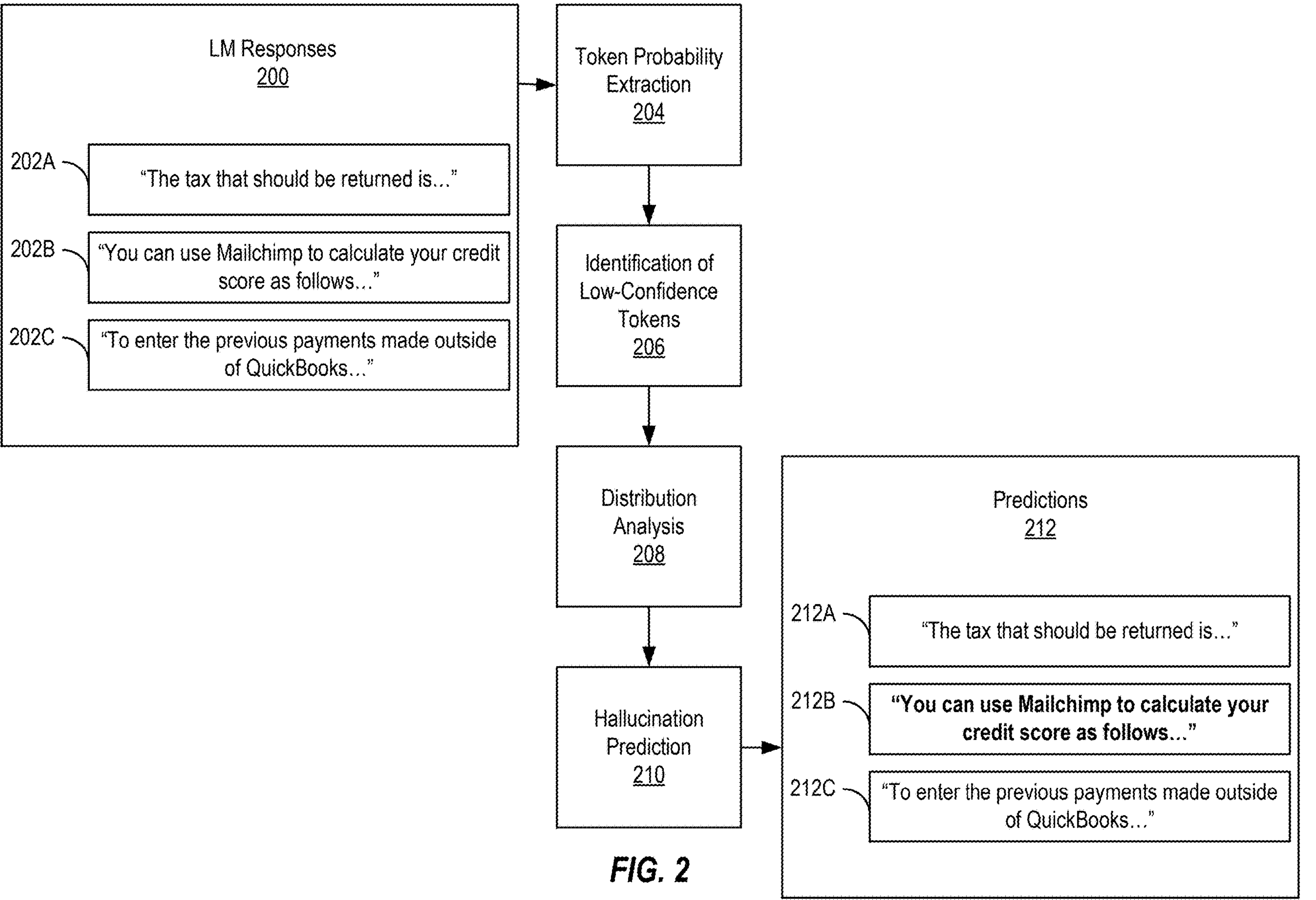
FIG. 2 depicts an example flow chart for performing a process for detecting hallucinations in language model outputs.

FIG. 2 depicts an example flow chart for performing a process for detecting hallucinations in LM outputs. In particular, FIG. 2 illustrates LM responses 200, such as response 202A, response 202B, and response 202C. LM responses 200 are the textual outputs generated by an LM in response to various user prompts. As described above, some of the LM responses 200 may potentially include hallucinations, e.g., inaccurate, or fabricated information within the generated content.

In order to detect hallucinations that may be in the LM responses (e.g., outputs), the hallucination detection process commences with token probability extraction 204. In this aspect, the hallucination detection service is configured to analyze each response and extract the confidence scores associated with each token. These confidence scores serve to represent the confidence of the LM in predicting each token during the generation process. Token probability extraction is described in more detail with respect to FIG. 3.

Thereafter, the hallucination detection process proceeds to the identification of low-confidence tokens 206. In particular, tokens exhibiting confidence scores below a predefined or dynamically computed confidence score threshold are identified as "low-confidence tokens." In some aspects, the confidence score threshold is valued between 0 and 1. In some aspects, the range of confidence score thresholds may represent a lowest confidence score and a highest confidence score associated with an LM output or a set of LM outputs. As a result, these tokens are deemed indicative of regions where the LM may exhibit uncertainty or a propensity toward generating hallucinations. The identification of low-confidence tokens is described in more detail with respect to FIG. 4.

Subsequently, the hallucination detection process includes a distribution analysis 208, which involves analyzing the identified low-confidence tokens within each response. The analysis may further involve determining one or more unsupervised attributes, such as the density of low-confidence tokens described in more detail with respect to FIG. 5, cluster attributes described in more detail with respect to FIG. 6, the positional encoding of these tokens within the response described in more detail with respect to FIG. 7, and/or sliding window attributes described in more detail with respect to FIG. 8. In some aspects, the result of the distribution analysis 208 includes generating a feature vector corresponding to a respective LM response. The generation of the feature vector is described in more detail with respect to FIG. 9.

In some aspects, the hallucination detection service is designed to operate in unsupervised environments, eliminating the need for labeled datasets or external verification sources. By leveraging characteristics naturally present in LM outputs, such as token confidence scores, their distributions, and corresponding attributes, the hallucination detection service is able to identify potential hallucinations without relying on pre-existing annotations or external fact-checking databases. This unsupervised approach ensures adaptability across diverse applications and datasets and enables the efficient detection of hallucinations even in scenarios where labeled data is unavailable or impractical to obtain. As a result, the disclosed aspects herein provide a scalable and resource-efficient solution for improving the reliability of LM outputs.

Following the feature vector generation, the hallucination detection process advances to hallucination prediction 210. In particular, the system is configured to apply an unsupervised anomaly detection algorithm, such as LOF, which evaluates the extracted features to compute an anomaly score. This anomaly score is then compared against a predetermined threshold to determine whether the analyzed response is likely to contain hallucinations.

To accomplish this, the system maintains a rolling set of recent response vectors, which serve as reference points that represent the typical distribution of language model outputs over time. When a new response is processed, its feature vector—comprising attributes such as density, clustering, positional encoding, and sliding window metrics—is compared against this rolling reference set. The LOF algorithm computes an LOF score for the current response vector by assessing its local density relative to its neighbors in the reference set. If the LOF score is significantly higher than those of the reference points (for example, exceeding a threshold such as 1.5, or a dynamically determined value based on the distribution of historical LOF scores), the response is flagged as a potential hallucination. This approach enables the system to adaptively and efficiently identify anomalous outputs that deviate from the model's typical behavior, without requiring labeled data or external validation.

In certain aspects, as new response vectors are generated, they are added to the reference set while older vectors are removed based on a predefined retention policy, such as a fixed maximum size or a time-based expiration criterion. This dynamic maintenance of the reference set allows the LOF algorithm to evaluate the current response vector against a representative and up-to-date subset of prior outputs, thereby improving the accuracy of anomaly detection. In some aspects, the reference set may be further refined by filtering out vectors that exhibit significant outlier behavior or by clustering similar vectors to reduce redundancy, ensuring that the reference set remains both computationally efficient and representative of the LM's typical output patterns.

In some aspects, the hallucination detection service may be further parameterized and fine-tuned to optimize the performance of the hallucination detection process. For example, some parameters including the sliding window size, the number of neighbors for the LOF algorithm, and the LOF anomaly score threshold, may be fine-tuned and adjusted. In some aspects, the LOF algorithm could be configured with 20 neighbors and an anomaly score threshold of 1.5. However, such values may not be universally optimal across all LM outputs and may require fine-tuning based on the specific characteristics of the LM outputs and the application context. Fine-tuning involves analyzing the observed distributions of token confidence scores and LOF outputs, potentially using techniques such as grid search or random search over parameter ranges, to identify configurations that balance sensitivity and specificity.

For example, in some aspects, the LOF anomaly score threshold may be decreased or increased to achieve the desired balance between sensitivity and specificity in hallucination detection. Lowering the threshold makes the system more sensitive, resulting in more outputs being flagged as potential hallucinations, which can be beneficial in high-risk applications where minimizing false negatives is critical. However, this increased sensitivity may also lead to a higher rate of false positives, where reliable outputs are incorrectly identified as hallucinations. Conversely, raising the threshold reduces the likelihood of false positives, ensuring that only the most anomalous outputs are flagged, but this may also increase the risk of missing subtle hallucinations. The optimal threshold value may vary depending on the specific use case, the distribution of confidence scores in the language model outputs, and the acceptable trade-off between false positives and false negatives. This adaptability ensures that the hallucination detection service can be tailored to diverse datasets and use cases, enhancing robustness and reliability in detecting hallucinations.

In addition to or instead of the LOF algorithm, the hallucination detection service may one or more other unsupervised statistical models or heuristics for detecting hallucinations in LM outputs. For example, clustering algorithms such as k-means or Density-Based Spatial Clustering of Applications with Noise (DBSCAN) may be employed to analyze the distribution of low-confidence tokens within a response. These algorithms can identify patterns or clusters of low-confidence tokens that may indicate regions of potential hallucination. Specifically, k-means can partition the low-confidence tokens into distinct clusters based on their proximity in the feature space, while DBSCAN can detect dense regions of low-confidence tokens and isolate outliers that deviate from typical patterns.

The hallucination detection process concludes with the generation of predictions 212. In this aspect, predictions 212 includes a classification of each LM response as either likely containing hallucinations or not. For example, prediction 212A, prediction 212B, and prediction 212C correspond respectively to response 202A, response 202B, and response 202C. As a result, responses flagged as likely containing hallucinations, such as prediction 212B, are highlighted for further review or filtering, whereas responses such as prediction 212A and prediction 212C are deemed reliable for downstream processing. Reliable responses are responses that do not include hallucinations generated by the LM.

Token Probability Extraction

FIG. 3 depicts an example of an LM output including a set of tokens and a set of corresponding confidence scores. FIG. 3 depicts LM output 302, which comprises a sequence of tokens and their corresponding confidence scores. As shown in FIG. 3, LM output 302 comprises a generated response: "According to the IRS tax code, 401K contributions are tax-deferred while the Platinum Tax Relief Program allows citizens to claim up to $12,500 in additional exemptions." In LM output 302, each token, representing a word or phrase generated by the LM in response to a given input query, is associated with a numerical confidence score, such as confidence score included in confidence scores 306, that quantifies the model's certainty in predicting that particular token during the generation process.

For example, the token "According" is associated with a confidence score of 0.94, indicating a high level of predictive certainty by the LM. Similarly, the token "to" is associated with a confidence score of 0.95, also indicating a high level of predictive certainty. These confidence scores are derived from the LM's internal probability distribution over the vocabulary, which is computed during the token generation process.

In particular, during the token generation process, the LM predicts the next token in a sequence by evaluating all possible tokens in its vocabulary. For each prediction step, the model produces a set of raw output values known as logits, one logit for each token in the vocabulary. These logits are then transformed into probabilities using, for example, a SoftMax function, which normalizes the values so that they sum to one and can be interpreted as probabilities.

The probability assigned to each token represents the model's confidence that the token is the correct next token in the sequence, given the preceding context. The confidence score for the generated token is equal to the probability value corresponding to that token. This process is repeated for each token generated in the output sequence, resulting in a confidence score for every token in the LM response, such as LM output 302.

Higher confidence scores indicate that the model is more certain about its prediction, while lower scores indicate greater uncertainty. For example, the token "401(k)" is illustrated with a confidence score of 0.93, whereas the token "tax-deferred" is marked by a slightly lower confidence score of 0.78. Notably, certain tokens may exhibit significantly lower confidence scores relative to others. For example, the token "Program" is assigned a confidence score of 0.47, and the token "$12,500" is assigned a confidence score of 0.45. These tokens, often referred to as "low-confidence tokens," may signal sections where the LM encountered challenges in generating predictions with high certainty. When LMs are less certain about a particular token prediction, the LMs are more likely to hallucinate the next one or more tokens in the output sequence. As a result, these low-confidence tokens draw attention in the context of hallucination detection, as they may correspond to segments of the LM output that are more susceptible to inaccuracies or fabricated information associated with hallucinations in generated output.

Thus, the confidence scores provide a quantitative basis for analyzing the reliability of the LM's output. Moreover, by examining the distribution of these scores throughout the token sequence, one can identify patterns—such as clusters of low-confidence tokens or positional attributes within the output—that may be leveraged to assess the likelihood of hallucinations in the generated text, as detailed in the description below.

Identifying Low-Confidence Tokens

FIG. 4 depicts an example of an LM output reflecting the identification of low-confidence tokens in an LM output based on a confidence score threshold. As described above, LM output 302 comprises a sequence of tokens, wherein each token is coupled with a corresponding numerical confidence score that signifies the level of certainty in the prediction during the generation process.

In certain aspects, confidence score thresholds, such as confidence score threshold 404, are utilized to identify low-confidence tokens within a LM output, such as LM output 302. In some aspects, a confidence score threshold may be defined as a fixed value based on the expected range of outputs for the LM probability values. For example, the confidence score threshold 404 is defined at a fixed value of 0.70, which is a value located between the minimum and maximum confidence scores associated with LM output 302.

In some aspects, the threshold may be dynamically computed using an adaptive approach, such as determining the 10th percentile of confidence scores within a given response or batch of responses. This adaptive thresholding allows the system to account for variations in confidence score distributions across different outputs, ensuring that the identification of low-confidence tokens is tailored to the specific characteristics of each response. By employing either a fixed or adaptive threshold, the system systematically isolates tokens that are more likely to contribute to hallucinations, enabling further analysis of their distribution, clustering, and positional attributes.

As mentioned above, the confidence score threshold 404 is designated at a level of 0.70, whereby tokens in LM output 302 with confidence scores lower than the confidence score threshold are systematically identified as "low-confidence tokens." Low-confidence tokens serve as indicators of regions where the LM demonstrates reduced certainty in the generated output. For example, in the LM output 302, tokens such as "Program" (confidence score 0.47), "$12,500" (confidence score 0.45), and "Tax" (confidence score 0.52) are highlighted (in bold) as low-confidence tokens due to their scores falling below the specified threshold. Here, the low-confidence tokens that fall below the confidence score threshold 404 set at 0.70 include "Platinum", "Tax", "Relief", "Program", "allows", and "$12,500."

In some aspects, the hallucination detection service is also configured to identify and flag tokens that have confidence scores that, while still above the confidence score threshold 404, are approaching the confidence score threshold 404 and/or exhibit a decrease in confidence score values as compared to adjacent tokens. As one example, the tokens "tax-deferred," "while," and "the" exhibit confidence scores between 0.75-0.78, while the preceding tokens exhibit confidence scores in the range of 0.92-0.95. Thus, "tax-deferred," "while," and "the" tokens are highlighted in italics to indicate this relative decrease in confidence score values as compared to adjacent tokens.

In some aspects, the identification of low-confidence tokens based on the confidence score threshold 404 enables further evaluative analysis of the LM output 302. This analysis may encompass examining the spatial distribution, clustering behavior, or positional attributes of the identified low-confidence tokens to assess the potential for hallucinations or inaccuracies within the generated text. Thus, by using this threshold-based identification, the system is enabled to isolate potentially problematic regions in the output, which may then be subjected to additional processing or filtering for enhanced accuracy and reliability.

Density of Low-Confidence Tokens

FIG. 5 depicts LM output 302 and the corresponding density 508 of low-confidence tokens in LM output 302. The total number of tokens in LM output 302 is denoted as total tokens 504, which, in the illustrated example, comprises 27 tokens. A subset of these tokens is identified as low-confidence tokens 506. Specifically, low-confidence tokens 506 are defined as those tokens whose confidence scores fall below a predefined threshold, such as confidence score threshold 404 of FIG. 4, thereby indicating regions where the LM exhibits reduced certainty. In this instance, 9 tokens are identified as low-confidence tokens 506.

Subsequently, the density 508 of low-confidence tokens 506 is determined as the ratio of low-confidence tokens 506 to total tokens 504. In the disclosed example, the density 508 is computed as 9 divided by 27, yielding a value of 33%. This density metric provides a quantitative measure of the concentration of low-confidence tokens 506 within the LM output 302.

Furthermore, as illustrated, the density of low-confidence tokens 506 serves as a feature for analyzing the reliability of the LM output 302. By identifying and quantifying the distribution of low-confidence tokens 506, the system can assess the likelihood of hallucinations or inaccuracies in the generated text. Thus, this analysis forms an important part of the unsupervised hallucination detection process as described in the present disclosure.

Cluster Attributes

FIG. 6 depicts an example of LM output reflecting the identification of clusters and corresponding cluster attributes 600 derived from the analysis of a LM output. As described above, LM output 302 comprises a sequence of tokens, each token being associated with a numerical confidence score that reflects the LM's level of certainty in predicting the token during the generation process. Accordingly, tokens exhibiting lower confidence scores are identified as low-confidence tokens, thereby indicating regions where the LM demonstrates reduced certainty and an increased likelihood of generating hallucinations.

As shown in FIG. 6, cluster attributes 600 includes the number of clusters 604, the average cluster size 606, and the maximum cluster size 608. In particular, the number of clusters 604 represents the total count of distinct clusters of low-confidence tokens identified within LM output 302. For example, three clusters are identified, where a cluster is defined as a contiguous sequence of low-confidence tokens, each bearing a confidence score below a predefined threshold.

Furthermore, the average cluster size 606 is calculated as the mean size of the identified clusters. In this example, the cluster sizes are indicated as 3 tokens, 5 tokens, and 1 token, respectively. As a result, the average cluster size is determined by computing the arithmetic mean according to the following example calculation: Average Cluster Size=(3+5+1)/3, which equals 3 tokens. Moreover, the maximum cluster size 608 represents the size of the cluster with the greatest number of tokens among those identified. In the present example, the cluster with the greatest number of tokens comprises 5 tokens.

Thus, by analyzing these cluster attributes 600, the system is able to derive meaningful insights into the distribution and density of low-confidence tokens within LM output 302. As a result, these attributes serve as features for further processing, such as anomaly detection, to assess the likelihood of hallucinations in the generated text.

Positional Encoding Attributes

FIG. 7 depicts an example of LM output reflecting the positional encoding analysis of low-confidence token densities across segmented portions of a LM output, in order to identify one or more positional encoding attributes 700. This is achieved by segmenting the LM output into a plurality of segments (e.g., two or more segments) and analyzing each segment to determine attributes about low-confidence tokens within each segment of the LM output. In some aspects, as shown in FIG. 7, LM output 302 is segmented into three distinct parts: the beginning segment 704, the middle segment 706, and the end segment 708.

For example, the beginning segment 704 comprises tokens such as "According to the IRS tax code," with confidence scores ranging from 0.94 to 0.92. Since none of these tokens fall below the predefined threshold indicating low confidence, the beginning density 710 is calculated as 0/6, corresponding to 0%. As a result, this segment illustrates a region devoid of low-confidence tokens.

The middle segment 706 includes tokens such as "401(k) contributions are tax-deferred," with confidence scores ranging from 0.93 to 0.78. In some aspects, as shown in the example depicted FIG. 7, the middle segment does not comprise any identified low-confidence tokens with confidence scores falling below the confidence score threshold. Thus, the middle density 712 is calculated as 0/4, corresponding to 0%. In some aspects, different from the example depicted in FIG. 7, the token "tax-deferred" may have a confidence score approaching the confidence score threshold and decreasing from adjacent token(s), which would constitute one low-confidence token within this segment. As a result, the middle density 712 may be determined as 1/4, equating to 25% (not shown in FIG. 7). In some aspects, different from the example depicted in FIG. 7, tokens with confidence scores that are less than adjacent tokens and/or approaching the confidence score threshold may be valued at 1/2 of a low-confidence token, such that the middle density may be calculated as 0.5/4, corresponding to 12.5% (not shown in FIG. 7).

The end segment 708 comprises tokens such as "while the Platinum Tax Relief Program allows citizens to claim up to $12,500 in additional exemptions," with confidence scores ranging from 0.45 to 0.91. The end segment 708 comprises 8 low-confidence tokens, including "Platinum," "Tax," "Relief," "Program," "allows," and "$12,500," which have corresponding confidence scores that fall below the confidence score threshold of 0.70 (illustrated in FIG. 4). Hence, the end density 714 is calculated as 6/15, or 40%, thereby indicating a significant presence of low-confidence tokens in this portion.

In addition to the segmentation of the LM output into three distinct parts, such as beginning segment 704, middle segment 706, and end segment 708, other embodiments may employ alternative segmentation configurations to enhance the analysis of low-confidence token distributions. For instance, the output could be divided into a greater number of segments, such as quartiles or quintiles, to provide a more granular view of token confidence across the response. In some aspects, segmentation could be dynamically determined based on the length of the output, where shorter outputs are divided into fewer segments and longer outputs are divided into more segments to maintain proportional granularity. Another aspect may involve segmenting the output based on syntactic or semantic boundaries, such as sentences, paragraphs, or logical sections, to align the analysis with the natural structure of the text. As another example, overlapping segments could be employed, where each segment shares a portion of tokens with adjacent segments, to capture transitional patterns in token confidence. These segmentation approaches allow for greater flexibility in tailoring the analysis to specific use cases or response characteristics, thereby improving the detection of hallucinations in LM outputs.

Thus, the positional encoding analysis provides a normalized ratio of low-confidence tokens in each segment, thereby offering a systematic insight into the spatial distribution of tokens exhibiting low confidence. Accordingly, this segmentation and density calculation approach facilitates the identification of regions within the LM output that may be more prone to hallucinations, thereby enabling further analysis and anomaly detection.

Sliding Window Attributes

Figure 8:
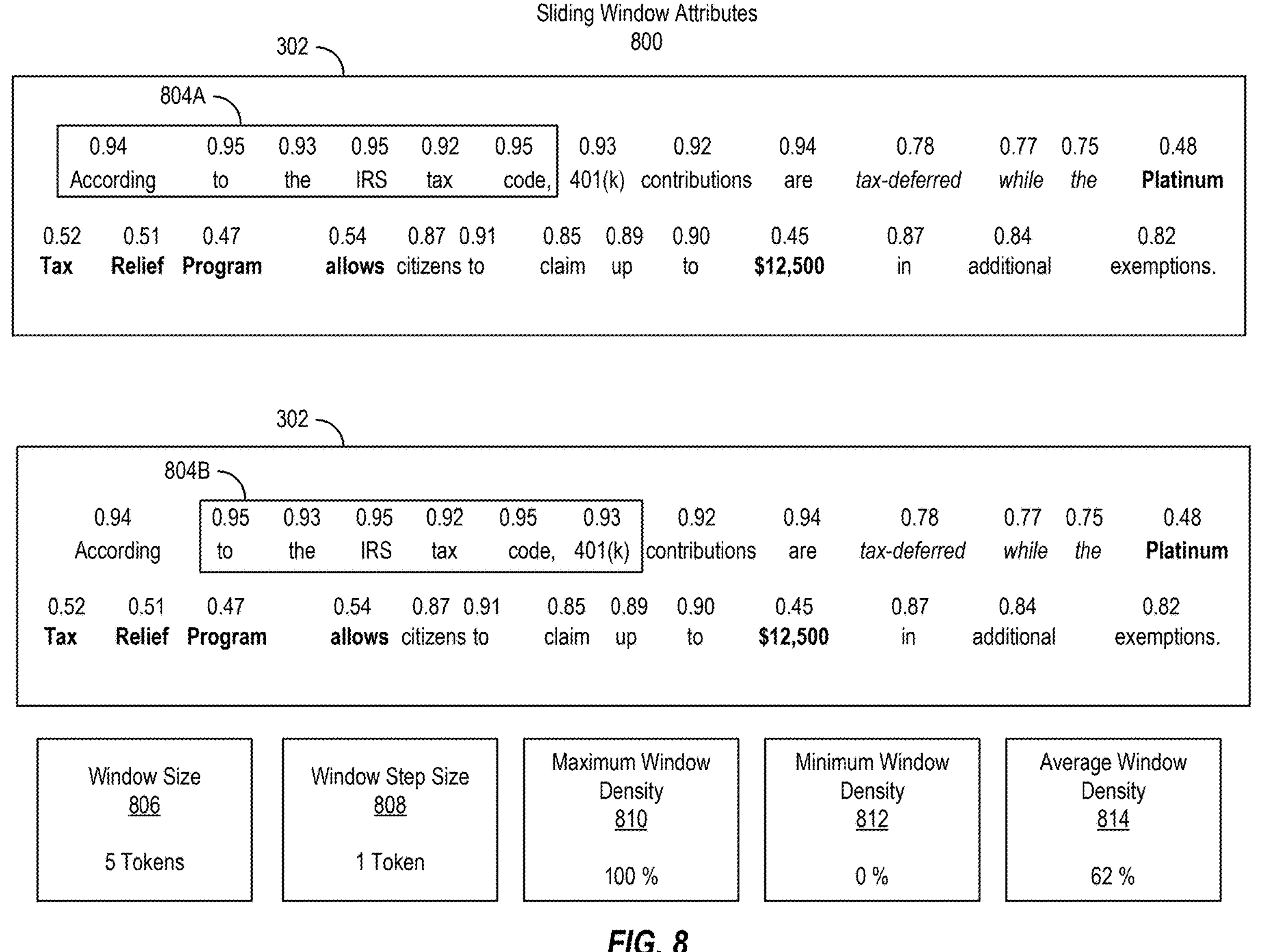
FIG. 8 depicts an example process for performing a sliding window analysis to determine token density metrics in language model outputs.

FIG. 8 depicts an example process for performing a sliding window analysis to determine token density metrics in LM outputs. In particular, FIG. 8 depicts an LM output 302, consisting of a sequence of tokens, where each token is associated with a corresponding confidence score. Accordingly, the sliding window analysis is configured to systematically analyze subsets of tokens within the output to compute various density metrics.

The LM output 302 is segmented into overlapping windows of a predefined size, referred to herein as the window size 806. In this example, window size 806 is set to 5 tokens, such that each window comprises five consecutive tokens from the LM output. As a result, the windows are incrementally shifted by a predefined step size, designated as window step size 808. Here, the window step size 808 is defined as 1 token, thereby indicating that each subsequent window commences one token after the prior window. A first window 804A is shown comprising tokens "According to the IRS tax code", and a second window 804B, which is a one token step from the first window 804A, is shown comprising "to the IR tax code, 401(k)."

In some aspects, the density of low-confidence tokens is calculated for each window. As a result, the sliding window analysis computes various primary metrics based on the density of low-confidence tokens: the maximum window density 810, the minimum window density 812, and the average window density 814.

More specifically, the maximum window density 810 represents the peak density of low-confidence tokens observed across all windows, thereby identifying the window with the most significant concentration of tokens indicating reduced model certainty. This may signal a localized region of uncertainty or potential hallucination. On the other hand, the minimum window density 812 represents the least observed density of low-confidence tokens, thereby highlighting regions of increased confidence. This may signal a localized region of reliability. Furthermore, the average window density 814 provides a general measure of the concentration of low-confidence tokens throughout the entire LM output, offering a normalized view of the model's confidence distribution.

Accordingly, the process depicted in FIG. 8 enables a granular examination of token confidence levels within the LM output. By leveraging the computed density metrics, the system is configured to identify patterns and regions of uncertainty, which can be used for detecting potential hallucinations within the generated text.

Generating Feature Vectors

Figure 9:
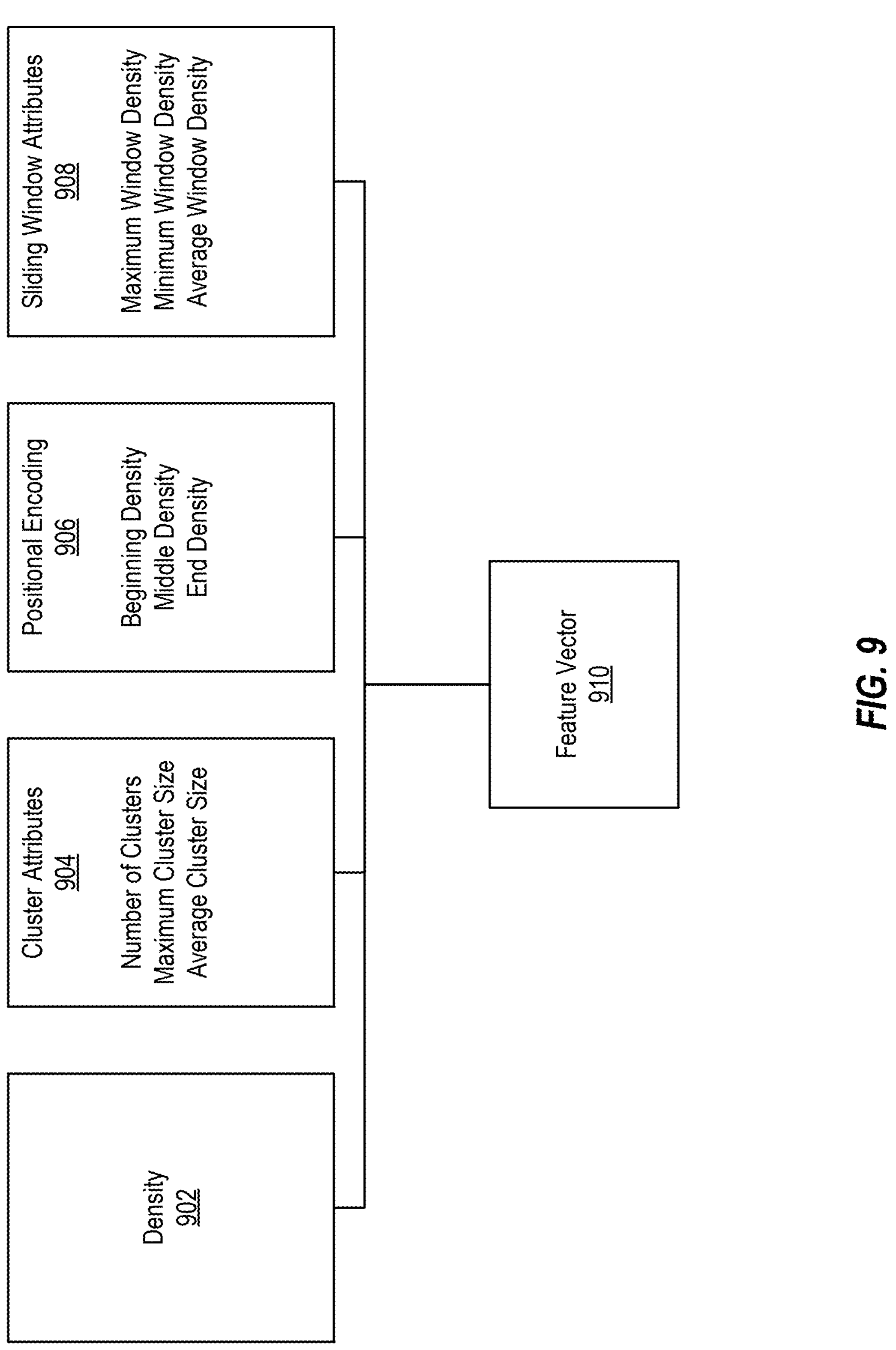
FIG. 9 depicts a block diagram for generating a feature vector based on density, cluster attributes, positional encoding, and sliding window attributes.

FIG. 9 depicts a block diagram associated with generating a feature vector 910 based on density, cluster attributes, positional encoding, and sliding window attributes. In particular, feature vector 910 is configured to serve as a consolidated representation of various unsupervised attributes, which are extracted to facilitate the detection of hallucinations in LM outputs. A feature vector is a numerical representation of an object or data point, where each element in the vector corresponds to a specific feature or attribute of the object. In machine learning and data analysis, feature vectors are used to encode relevant information about data samples in a structured format, enabling algorithms to process and analyze the data effectively. Feature vectors are typically used as input for predictive models, clustering algorithms, or other computational methods.

Accordingly, the first component contributing to feature vector 910 is density 902, which is comparable to density 508 of FIG. 5. In particular, density 902 represents the ratio of low-confidence tokens to the total number of tokens in the LM output. Thus, density 902 is configured to provide a quantitative measure of the overall concentration of low-confidence tokens, which is indicative of regions where the LM exhibits reduced certainty.

In some aspects, a second component, identified as cluster attributes 904, is configured to capture characteristics of clusters formed by contiguous low-confidence tokens. In some aspects, cluster attributes 904 are comparable to cluster attributes illustrated in FIG. 9. Specifically, cluster attributes 904 include the number of clusters, the maximum cluster size, and the average cluster size, thereby providing insights into the spatial distribution and grouping behavior of low-confidence tokens, which, in some aspects, can be indicative of potential hallucinations.

In some aspects, a third component is the positional encoding 906. In this context, positional encoding 906 is designed to encode the positional distribution of low-confidence tokens within the LM output by dividing the output into distinct segments such as the beginning, middle, and end. For each segment, the positional encoding 906 calculates the normalized density of low-confidence tokens, referred to as the beginning density, middle density, and end density. This segmentation enables the identification of regions within the output that are more prone to hallucinations.

In some aspects, a fourth component is the sliding window attributes 908. As illustrated, sliding window attributes 908 embody the application of a sliding window analysis across the LM output. In this regard, the sliding window attributes 908 include the maximum window density, minimum window density, and average window density, each calculated based on the density of low-confidence tokens within a specified window. These attributes offer a localized view of token density, which facilitates the detection of concentrated regions of low-confidence tokens.

Beneficially, aspects for detecting hallucinations in LM outputs allow for the inclusion of additional unsupervised features beyond attributes illustrated in FIG. 9. For example, other distributional features could involve measures of skewness or kurtosis of token confidence scores, which may provide insights into the asymmetry or peaks of the confidence distribution. Similarly, advanced clustering features could incorporate hierarchical clustering techniques or density-based metrics, such as the silhouette coefficient, to evaluate the quality and separation of low-confidence token clusters. Positional encoding may also be refined by utilizing sinusoidal functions or other mathematical transformations to capture more detailed spatial relationships of low-confidence tokens within the output. Additionally, features derived from comparing the distribution of low-confidence tokens to known statistical distributions, such as Gaussian or exponential distributions, could be applied to identify deviations that suggest hallucinations. These expansion options emphasize the adaptability of the hallucination detection service, enabling the approach to align with diverse datasets and application requirements while preserving its unsupervised nature.

Subsequently, the outputs of density 902, cluster attributes 904, positional encoding 906, and sliding window attributes 908 are aggregated to generate feature vector 910. Thereafter, feature vector 910 encapsulates a comprehensive suite of unsupervised attributes that collectively represent the characteristics of the LM output. Accordingly, feature vector 910 is subsequently utilized in downstream processes, such as anomaly detection algorithms, to predict the likelihood of hallucinations in the analyzed output.

Example Method for Detecting Hallucinations in LM Outputs

Figure 10:
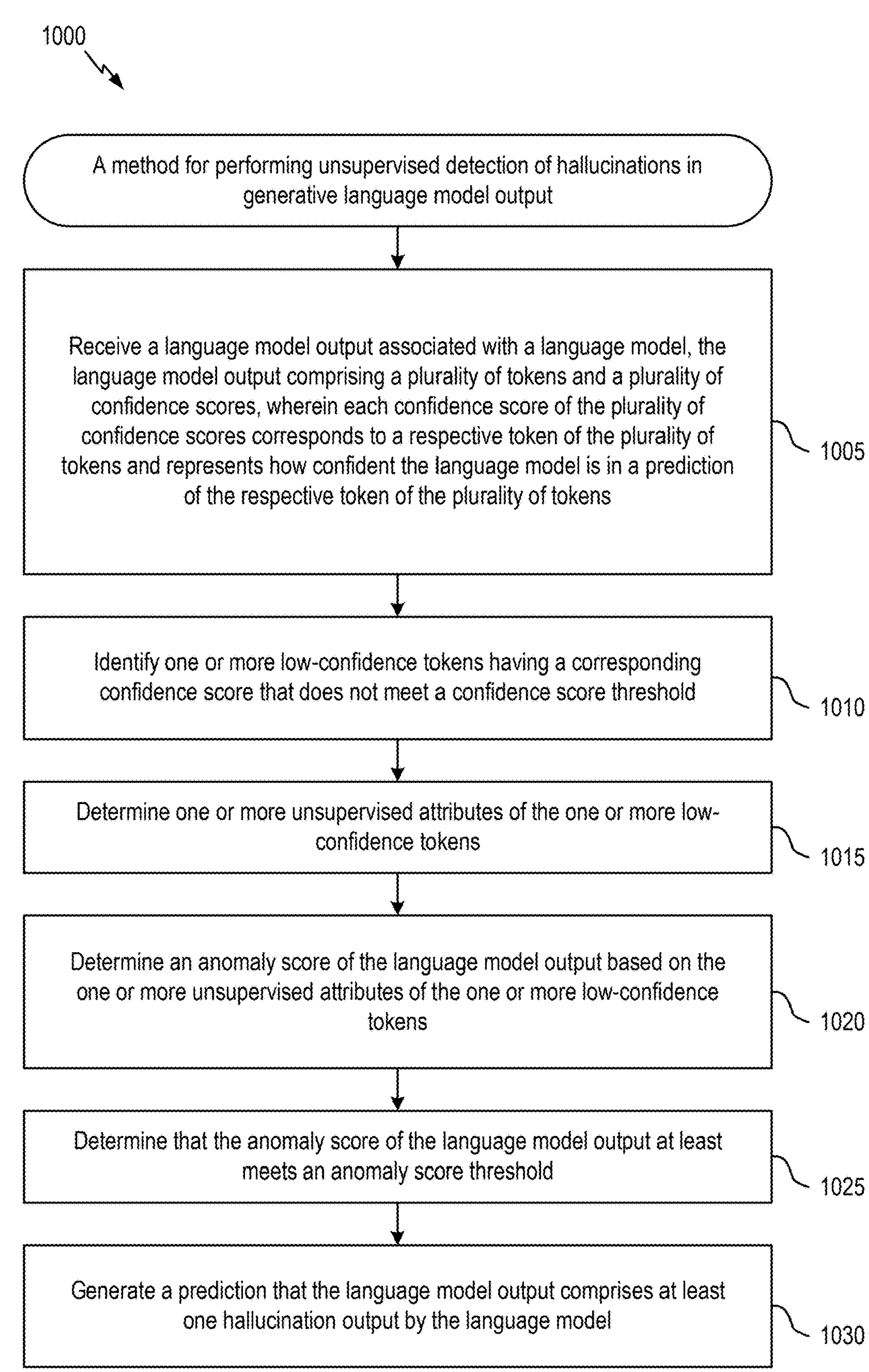
FIG. 10 depicts a flowchart of a method for detecting hallucinations in language model output.

FIG. 10 depicts an example method 1000 for performing unsupervised detection of hallucinations in generative LM output. In one aspect, method 1000 can be implemented by processing system 1100 of FIG. 11.

Figure 11:
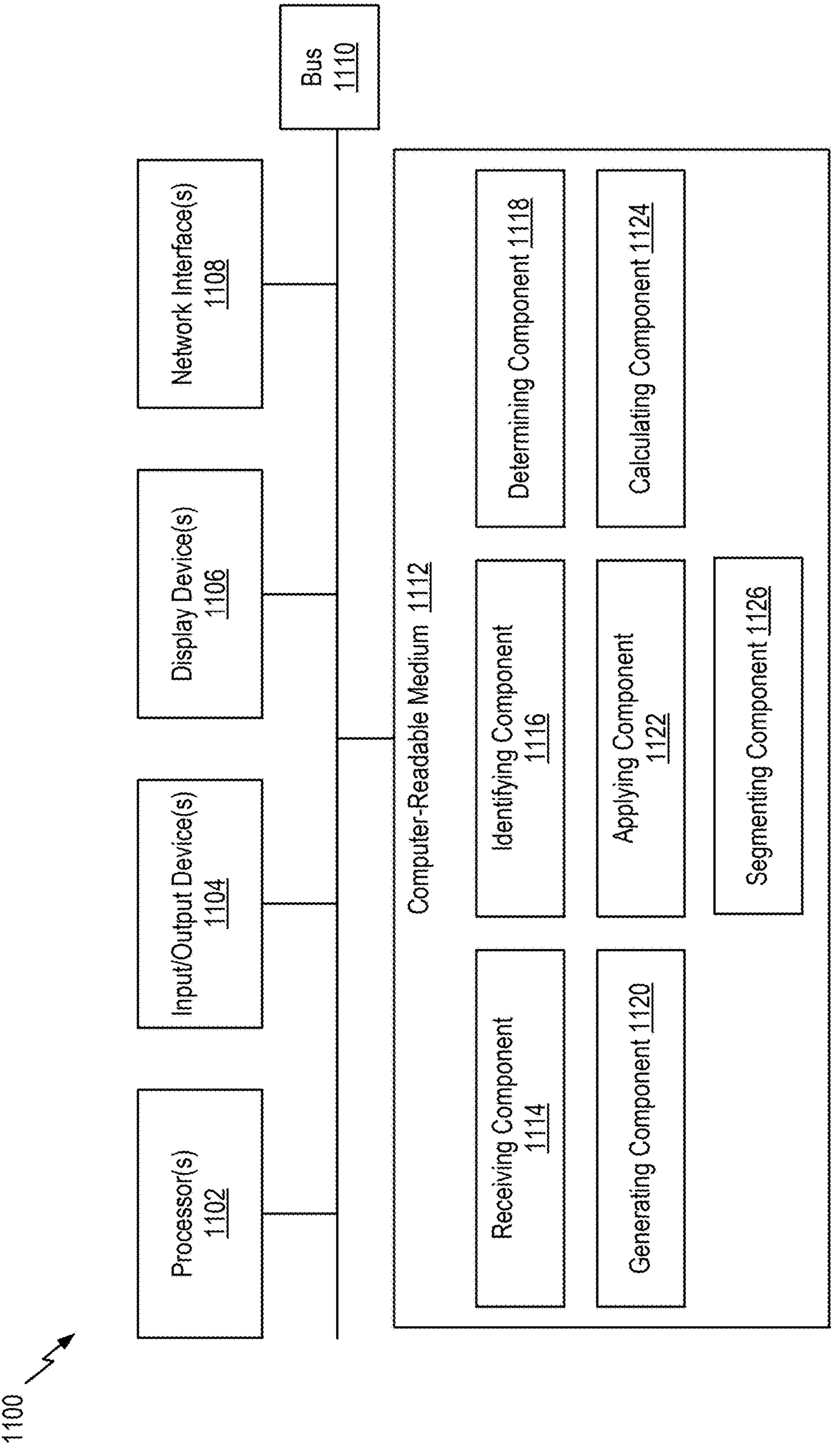
FIG. 11 depicts an example processing system with which aspects of the present disclosure can be performed.

Method 1000 begins at block 1005 with receiving an LM output associated with an LM. The LM output comprises a plurality of tokens and a plurality of confidence scores, wherein each confidence score of the plurality of confidence scores corresponds to a respective token of the plurality of tokens and represents how confident the LM is in a prediction of the respective token of the plurality of tokens. In some aspects, receiving component 1114 of FIG. 11 is configured to receive LM output 302 of FIG. 3.

Method 1000 then proceeds to block 1010 with identifying one or more low-confidence tokens having a corresponding confidence score that does not meet a confidence score threshold. In some aspects, identifying component 1116 is configured to identify one or more low-confidence tokens in LM output 302 having a corresponding confidence score that does not meet the confidence score threshold 404 of FIG. 4.

Method 1000 then proceeds to block 1015 with determining one or more unsupervised attributes of the one or more low-confidence tokens. In some aspects, determining component 1118 of FIG. 11 is configured to determine one or more unsupervised attributes of the one or more low-confidence tokens, such as number of the low-confidence tokens 506 of FIG. 5, density 508 of low-confidence tokens of FIG. 5, cluster attributes 600 of FIG. 6, positional encoding attributes 700, and/or sliding window attributes 800 of FIG. 8.

Method 1000 then proceeds to block 1020 with determining an anomaly score of the LM output based on the one or more unsupervised attributes of the one or more low-confidence tokens. In some aspects, determining component 1118 of FIG. 11 is configured to determine an anomaly score of LM output 302 based on the one or more unsupervised attributes of the one or more low-confidence tokens.

Method 1000 then proceeds to block 1025 with determining that the anomaly score of the LM output at least meets an anomaly score threshold. In some aspects, determining component 1118 of FIG. 11 is configured to determine that the anomaly scores of LM output 302 at least meets an anomaly score threshold.

Method 1000 then proceeds to block 1030 with generating a prediction that the LM output comprises at least one hallucination output by the LM. In some aspects, generating component 1120 is configured to generate a prediction, such as one of predictions 212 of FIG. 2, response 202B comprises at least one hallucination output by the LM.

In some aspects, the one or more unsupervised attributes comprises a maximum window density, and the method 1000 further comprises: applying a sliding window across the LM output based on a window size and a window step size; calculating one or more local densities of one or more windows based on applying the sliding window across the LM output; and determining a maximum window density of the one or more local densities. In some aspects, applying component 1122 of FIG. 11 is configured to apply the sliding window across LM output 302 based on window size 806 and window step size 808, such as first window 804A, and second window 804B, and so on. In some aspects, calculating component 1124 of FIG. 11 is configured to calculate one or more local densities of LM output 302. In some aspects, determining component 1118 of FIG. 11 is configured to determine the maximum window density 810 of LM output 302.

In some aspects, the one or more unsupervised attributes comprise an average window density, and the method 1000 further comprises: applying a sliding window across the LM output based on a window size and a window step size; calculating one or more local densities of one or more windows based on applying the sliding window across the LM output; and determining an average window density of the one or more local densities. In some aspects, applying component 1122 of FIG. 11 is configured to apply sliding window across LM output 302 based on window size 806 and window step size 808. In some aspects, calculating component 1124 of FIG. 11 is configured to calculate one or more local densities of LM output 302. In some aspects, determining component 1118 of FIG. 11 is configured to determine the average window density 814 of LM output 302.

In some aspects, the one or more unsupervised attributes comprise a density of low-confidence tokens, and the method 1000 further comprises determining a density of low-confidence tokens by determining a ratio of low-confidence tokens to the total tokens of the LM output. In some aspects, determining component 1118 of FIG. 11 is configured to determine density 508 of LM output 302 by determining the ratio of low-confidence tokens 506 to a total number of tokens (e.g., total tokens 504) of LM output 302.

In some aspects, the one or more unsupervised attributes comprise a positional encoding of each of the one or more low-confidence tokens relative to the LM output. In some aspects, the positional encoding is based on one or more of the positional encoding attributes 700 of FIG. 7 associated with one or more segments of LM output 302.

In some aspects, method 1000 further includes segmenting the LM output into two or more segments. In some aspects, segmenting component 1126 of FIG. 11 is configured to segment LM output 302 of FIG. 7 into two or more segments, including beginning segment 704 of FIG. 7, middle segment 706 of FIG. 7, and end segment 708 of FIG. 7.

In some aspects, method 1000 further includes determining a positional encoding of each of the one or more low-confidence tokens by determining a ratio of low-confidence tokens to a total number of tokens in each segment of the two or more segments. In some aspects, determining component 1118 of FIG. 11 is configured to determine the positional encoding of each of the one or more low-confidence tokens by determining a ratio of low-confidence tokens to a total number of tokens in each segment of the two or more segments, for example, a beginning density 710 of FIG. 7, a middle density 712 of FIG. 7, and an end density 714 of FIG. 7.

In some aspects, the one or more unsupervised attributes comprises one or more cluster attributes, and the method 1000 further comprises: identifying one or more clusters of the one or more low-confidence tokens; and identifying one or more cluster attributes of the one or more clusters. In some aspects, identifying component 1116 of FIG. 11 is configured to identify one or more clusters of the one or more low-confidence tokens and identifying one or more of the cluster attributes 600 of FIG. 6 of the one or more clusters of the LM output 302.

In some aspects, the one or more cluster attributes comprise a number of clusters of low-confidence tokens. For example, the one or more cluster attributes may comprise a number of clusters 604 of FIG. 6.

In some aspects, the one or more cluster attributes comprise an average cluster size of the one or more clusters. For example, the one or more cluster attributes may comprise an average cluster size 606 of FIG. 6.

In some aspects, the anomaly score of the LM output is determined based on applying a local outlier factor algorithm. In some aspects, determining component 1118 of FIG. 11 is configured to determine an anomaly score to be used in hallucination prediction 210 of FIG. 2.

Method 1000 provides a technical solution to the problem of detecting hallucinations in generative LM outputs without relying on labeled datasets or external fact-checking resources. By receiving an LM output that includes both tokens and their corresponding confidence scores, method 1000 enables fine-grained analysis of the model's certainty at the token level. The identification of low-confidence tokens helps to identify regions of uncertainty that are statistically more likely to contain hallucinations or fabricated content. By determining unsupervised attributes such as density, clustering, positional encoding, and sliding window metrics, method 1000 constructs a comprehensive feature vector that characterizes the distribution and behavior of low-confidence tokens within the output.

The subsequent calculation of an anomaly score allows the system to detect outputs that deviate from typical, high-confidence patterns, thereby flagging likely hallucinations. This process is performed entirely without the need for labeled training data or external verification, addressing the technical limitations of prior supervised approaches and enabling scalable, domain-agnostic deployment. Thus, method 1000 generates a prediction indicating the presence of hallucinations, which directly improves the reliability and trustworthiness of LM outputs. By identifying hallucinations in LM outputs, method 1000 reduces the risk of using misinformation in downstream applications and processing, thereby enhancing the user confidence in generative AI systems.

Example Processing System for Detecting Hallucinations in LM Outputs

FIG. 11 depicts an example processing system 1100 configured to perform various aspects described herein, including, for example, method 1000 as described above with respect to FIG. 10 and/or the flowchart depicted in FIG. 2.

Processing system 1100 is generally an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 1100 includes one or more processor(s) 1102, one or more input/output device(s) 1104, one or more display device(s) 1106, one or more network interface(s) 1108 through which processing system 1100 is connected to one or more networks (e.g., a local network, an intranet, the Internet, or any other group of processing systems communicatively connected to each other), and computer-readable medium 1112. In the depicted example, the aforementioned components are coupled by a bus 1110, which may generally be configured for data exchange amongst the components. Bus 1110 may be representative of multiple buses, while only one is depicted for simplicity.

Processor(s) 1102 are generally configured to retrieve and execute instructions stored in one or more memories, including local memories like computer-readable medium 1112, as well as remote memories and data stores. Similarly, processor(s) 1102 are configured to store application data residing in local memories like the computer-readable medium 1112, as well as remote memories and data stores. More generally, bus 1110 is configured to transmit programming instructions and application data among the processor(s) 1102, display device(s) 1106, network interface(s) 1108, and/or computer-readable medium 1112. In certain embodiments, processor(s) 1102 are representative of a one or more central processing units (CPUs), graphics processing unit (GPUs), tensor processing unit (TPUs), accelerators, and other processing devices.

Input/output device(s) 1104 may include any device, mechanism, system, interactive display, and/or various other hardware and software components for communicating information between processing system 1100 and a user of processing system 1100. For example, input/output device(s) 1104 may include input hardware, such as a keyboard, touch screen, button, microphone, speaker, and/or other device for receiving inputs from the user and sending outputs to the user.

Display device(s) 1106 may generally include any sort of device configured to display data, information, graphics, user interface elements, and the like to a user. For example, display device(s) 1106 may include internal and external displays such as an internal display of a tablet computer or an external display for a server computer or a projector. Display device(s) 1106 may further include displays for devices, such as augmented, virtual, and/or extended reality devices. In various embodiments, display device(s) 1106 may be configured to display a graphical user interface.

Network interface(s) 1108 provide processing system 1100 with access to external networks and thereby to external processing systems. Network interface(s) 1108 can generally be any hardware and/or software capable of transmitting and/or receiving data via a wired or wireless network connection. Accordingly, network interface(s) 1108 can include a communication transceiver for sending and/or receiving any wired and/or wireless communication.

Computer-readable medium 1112 may be a volatile memory, such as a random-access memory (RAM), or a nonvolatile memory, such as nonvolatile random-access memory (NVRAM), or the like. In this example, computer-readable medium 1112 includes receiving component 1114, identifying component 1116, determining component 1118, generating component 1120, applying component 1122, calculating component 1124, and segmenting component 1126. Processing of the components 1114-1126 may enable and cause the processing system 1100 to perform the method 1000 described with respect to FIG. 10, or any aspect related to it.

In certain embodiments, receiving component 1114 is configured to receive a LM output associated with a LM, the LM output comprising a plurality of tokens and a plurality of confidence scores, wherein each confidence score of the plurality of confidence scores corresponds to a respective token of the plurality of tokens and represents how confident the LM is in a prediction of the respective token of the plurality of tokens, as described in FIG. 10 with reference to block 1005. In certain embodiments, identifying component 1116 is configured to identify one or more low-confidence tokens having a corresponding confidence score that does not meet a confidence score threshold, as described in FIG. 10 with reference to block 1010. In certain embodiments, determining component 1118 is configured to determine one or more unsupervised attributes of the one or more low-confidence tokens, as described in FIG. 10 with reference to block 1015. In certain embodiments, determining component 1118 is configured to determine an anomaly score of the LM output based on the one or more unsupervised attributes of the one or more low-confidence tokens, as described in FIG. 10 with reference to block 1020. In certain embodiments, determining component 1118 is configured to determine that the anomaly score of the LM output at least meets an anomaly score threshold, as described in FIG. 10 with reference to block 1025. In certain embodiments, generating component 1120 is configured to generate a prediction that the LM output comprises at least one hallucination output by the LM, as described in FIG. 10 with reference to block 1030.

Note that FIG. 11 is just one example of a processing system consistent with aspects described herein, and other processing systems having additional, alternative, or fewer components are possible consistent with this disclosure.

Example Clauses

Implementation examples are described in the following numbered clauses:

Clause 1: A method for performing unsupervised detection of hallucinations in generative language model output, comprising: receiving a language model output associated with a language model, the language model output comprising a plurality of tokens and a plurality of confidence scores, wherein each confidence score of the plurality of confidence scores corresponds to a respective token of the plurality of tokens and represents how confident the language model is in a prediction of the respective token of the plurality of tokens; identifying one or more low-confidence tokens having a corresponding confidence score that does not meet a confidence score threshold; determining one or more unsupervised attributes of the one or more low-confidence tokens; determining an anomaly score of the language model output based on the one or more unsupervised attributes of the one or more low-confidence tokens; determining that the anomaly score of the language model output at least meets an anomaly score threshold; and generating a prediction that the language model output comprises at least one hallucination output by the language model.

Clause 2: The method of Clause 1, wherein: the one or more unsupervised attributes comprises a maximum window density, and the method further comprises: applying a sliding window across the language model output based on a window size and a window step size; calculating one or more local densities of one or more windows based on applying the sliding window across the language model output; and determining a maximum window density of the one or more local densities.

Clause 3: The method of any one of Clauses 1-2, wherein: the one or more unsupervised attributes comprise an average window density, and the method further comprises: applying a sliding window across the language model output based on a window size and a window step size; calculating one or more local densities of one or more windows based on applying the sliding window across the language model output; and determining an average window density of the one or more local densities.

Clause 4: The method of any one of Clauses 1-3, wherein: the one or more unsupervised attributes comprise a density of low-confidence tokens, and the method further comprises determining a density of low-confidence tokens by determining a ratio of low-confidence tokens to a total number of tokens of the language model output.

Clause 5: The method of any one of Clauses 1-4, wherein the one or more unsupervised attributes comprise a positional encoding of each of the one or more low-confidence tokens relative to the language model output.

Clause 6: The method of Clause 5, further comprising: segmenting the language model output into two or more segments; and determining a positional encoding of each of the one or more low-confidence tokens by determining a ratio of low-confidence tokens to a total number of tokens in each segment of the two or more segments.

Clause 7: The method of any one of Clauses 1-6, wherein: the one or more unsupervised attributes comprises one or more cluster attributes, and the method further comprises: identifying one or more clusters of the one or more low-confidence tokens; and identifying one or more cluster attributes of the one or more clusters.

Clause 8: The method of Clause 7, wherein the one or more cluster attributes comprise a number of clusters of low-confidence tokens.

Clause 9: The method of Clause 7, wherein the one or more cluster attributes comprise an average cluster size of the one or more clusters.

Clause 10: The method of any one of Clauses 1-9, wherein the anomaly score of the language model output is determined based on applying a local outlier factor algorithm.

Clause 11: A processing system, comprising: memory comprising computer-executable instructions; and one or more processors configured to execute the computer-executable instructions and cause the processing system to perform a method in accordance with any one of Clauses 1-10.

Clause 12: A processing system, comprising means for performing a method in accordance with any one of Clauses 1-10.

Clause 13: A non-transitory computer-readable medium storing program code for causing a processing system to perform the steps of any one of Clauses 1-10.

Clause 14: A computer program product embodied on a computer-readable storage medium comprising code for performing a method in accordance with any one of Clauses 1-10.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented, or a method may be practiced using any number of the aspects set forth herein. In addition, the scope of the disclosure is intended to cover such an apparatus or method that is practiced using other structure, functionality, structure, and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database, or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for performing unsupervised detection of hallucinations in generative language model output, comprising:

receiving a language model output associated with a language model, the language model output comprising a plurality of tokens and a plurality of confidence scores, wherein each confidence score of the plurality of confidence scores corresponds to a respective token of the plurality of tokens and represents how confident the language model is in a prediction of the respective token of the plurality of tokens;

identifying one or more low-confidence tokens, each having a corresponding confidence score that does not meet a confidence score threshold;

applying a sliding window across the language model output of a window size and a window step size;

calculating one or more local densities of one or more windows based on applying the sliding window across the language model output;

determining one or more unsupervised attributes of the one or more low-confidence tokens, wherein the one or more unsupervised attributes comprise a maximum window density;

determining the maximum window density, wherein the maximum window density is of the one or more local densities;

determining an anomaly score of the language model output based on the one or more unsupervised attributes of the one or more low-confidence tokens;

determining that the anomaly score of the language model output at least meets an anomaly score threshold; and generating a prediction that the language model output comprises at least one hallucination output by the language model.

2. The method of claim 1, wherein:

the one or more unsupervised attributes further comprise an average window density, and the method further comprises determining the average window density, wherein the average window density is of the one or more local densities.

3. The method of claim 1, wherein:

the one or more unsupervised attributes comprise a density of low-confidence tokens, and the method further comprises determining the density of low-confidence tokens by determining a ratio of low-confidence tokens to a total number of tokens of the language model output.

4. The method of claim 1, wherein the one or more unsupervised attributes comprise a positional encoding of each of the one or more low-confidence tokens relative to the language model output.

5. The method of claim 4, further comprising:

segmenting the language model output into two or more segments; and determining the positional encoding of each of the one or more low-confidence tokens by determining a ratio of low-confidence tokens to a total number of tokens in each segment of the two or more segments.

6. The method of claim 1, wherein:

the one or more unsupervised attributes comprise one or more cluster attributes, and the method further comprises:

identifying one or more clusters of the one or more low-confidence tokens; and identifying the one or more cluster attributes, wherein the one or more cluster attributes are of the one or more clusters.

7. The method of claim 6, wherein the one or more cluster attributes comprise a number of clusters of low-confidence tokens.

8. The method of claim 6, wherein the one or more cluster attributes comprise an average cluster size of the one or more clusters.

9. The method of claim 1, wherein the anomaly score of the language model output is determined based on applying a local outlier factor algorithm.

10. An apparatus comprising a processing system that includes one or more processors and one or more memories coupled with the one or more processors, the processing system configured to:

receive a language model output associated with a language model, the language model output comprising a plurality of tokens and a plurality of confidence scores, wherein each confidence score of the plurality of confidence scores corresponds to a respective token of the plurality of tokens and represents how confident the language model is in a prediction of the respective token of the plurality of tokens;

identify one or more low-confidence tokens, each having a corresponding confidence score that does not meet a confidence score threshold;

apply a sliding window across the language model output on a window size and a window step size;

calculate one or more local densities of one or more windows based on applying the sliding window across the language model output;

determine one or more unsupervised attributes of the one or more low-confidence tokens, wherein the one or more unsupervised attributes comprise an average window density;

determine the average window density, wherein the average window density is of the one or more local densities;

determine an anomaly score of the language model output based on the one or more unsupervised attributes of the one or more low-confidence tokens;

determine that the anomaly score of the language model output at least meets an anomaly score threshold; and generate a prediction that the language model output comprises at least one hallucination output by the language model.

11. The apparatus of claim 10, wherein:

the one or more unsupervised attributes further comprise a maximum window density, and the processing system is further configured to determine the maximum window density, wherein the maximum window density is of the one or more local densities.

12. The apparatus of claim 10, wherein:

the one or more unsupervised attributes comprise a density of low-confidence tokens, and the processing system is further configured to determine the density of low-confidence tokens by determining a ratio of low-confidence tokens to a total number of tokens of the language model output.

13. The apparatus of claim 10, wherein the one or more unsupervised attributes comprise a positional encoding of each of the one or more low-confidence tokens relative to the language model output.

14. The apparatus of claim 13, wherein the processing system is further configured to:

segment the language model output into two or more segments; and determine the positional encoding of each of the one or more low-confidence tokens by determining a ratio of low-confidence tokens to a total number of tokens in each segment of the two or more segments.

15. The apparatus of claim 10, wherein:

the one or more unsupervised attributes comprise one or more cluster attributes, and the processing system is further configured to:

identify one or more clusters of the one or more low-confidence tokens; and identify the one or more cluster attributes, wherein the one or more cluster attributes are of the one or more clusters.

16. The apparatus of claim 15, wherein the one or more cluster attributes comprise a number of clusters of low-confidence tokens.

17. The apparatus of claim 15, wherein the one or more cluster attributes comprise an average cluster size of the one or more clusters.

18. The apparatus of claim 10, wherein the anomaly score of the language model output is determined based on applying a local outlier factor algorithm.

* * * * *